United States Patent [19]

Salyer

[11] Patent Number: 4,797,160
[45] Date of Patent: Jan. 10, 1989

[54] PHASE CHANGE COMPOSITIONS
[75] Inventor: Ival O. Salyer, Dayton, Ohio
[73] Assignee: University of Dayton, Dayton, Ohio
[21] Appl. No.: 88,040
[22] Filed: Aug. 19, 1987

Related U.S. Application Data

[63] Continuation-in-part of Ser. No. 935,081, Nov. 24, 1986, abandoned, which is a continuation-in-part of Ser. No. 835,418, Mar. 3, 1986, abandoned, which is a continuation-in-part of Ser. No. 646,402, Aug. 31, 1984, Pat. No. 4,617,332.

[51] Int. Cl.⁴ .............................................. C04B 24/08
[52] U.S. Cl. ........................................ 106/96; 106/90; 106/314; 106/18.25; 106/18.19; 106/111; 428/921
[58] Field of Search .................... 106/90, 96, 314, 315, 106/18.19, 18.25, 111; 428/921

[56] References Cited

U.S. PATENT DOCUMENTS

| | | | |
|---|---|---|---|
| 3,677,808 | 7/1972 | Sheridan | 106/96 |
| 3,826,735 | 7/1974 | Shinomura | 208/21 |
| 4,036,301 | 7/1977 | Powers et al. | 106/96 |
| 4,175,069 | 11/1979 | Brenner | 524/252 |
| 4,207,115 | 6/1980 | Boehme et al. | 106/95 |
| 4,259,401 | 3/1981 | Chahroudi et al. | 428/306 |
| 4,415,696 | 11/1983 | Mark | 524/490 |
| 4,504,402 | 3/1985 | Chen et al. | 252/70 |
| 4,587,279 | 5/1986 | Salyer et al. | 524/4 |
| 4,612,255 | 9/1986 | Hein | 106/18.29 |
| 4,617,332 | 10/1986 | Salyer et al. | 106/85 |

FOREIGN PATENT DOCUMENTS

| | | | |
|---|---|---|---|
| 2937712 | 8/1980 | Fed. Rep. of Germany | 106/96 |
| 2087865 | 6/1982 | United Kingdom | 106/96 |

Primary Examiner—Steven Capella
Attorney, Agent, or Firm—Biebel, French & Nauman

[57] ABSTRACT

Compositions containing crystalline, straight chain, alkyl hydrocarbons as phase change materials including cementitious compositions containing the alkyl hydrocarbons neat or in pellets or granules formed by incorporating the alkyl hydrocarbons in polymers or rubbers; and polymeric or elastomeric compositions containing alkyl hydrocarbons.

18 Claims, 2 Drawing Sheets

PHASE CHANGE COMPOSITIONS

GOVERNMENT RIGHTS

The U.S. Government has certain rights under the inventions disclosed herein.

CROSS-REFERENCE TO RELATED APPLICATONS

This application is a continuation-in-part of U.S. application Ser. No. 935,081, filed Nov. 24, 1986, now abandoned, which is a continuation-in-part of U.S. application Ser. No. 835,418, filed Mar. 3, 1986, now abandoned, which is a continuation-in-part of U.S. application Ser. No. 646,402 filed Aug. 31, 1984, now U.S. Pat. No. 4,617,322.

BACKGROUND OF THE INVENTION

The present invention relates to compositions embodying phase change materials and, more particularly, to compositions containing crystalline, long chain alkyl hydrocarbons having at least 14 carbon atoms.

There is a great deal of interest in phase change thermal energy storage systems due to their inherent ability to store large amounts of heat and release it to the surrounding environment as temperatures drop below or exceed predetermined levels. These systems are of particular interest in the architectural and building trades where climate control and its concomitant energy consumption is one of the principal considerations in building design and material selection.

A variety of building materials and techniques have previously been used to conserve heat or cool and thereby reduce energy costs. Included among them are structural elements which incorporate phase change materials. By incorporating phase change materials into building materials, energy in excess of that necessary to maintain comfort conditions is inherently absorbed and released as required to maintain the comfort range. Thus, in winter months, phase change materials incorporated into structural elements in the walls or floors of buildings and the like can absorb solar energy during daytime hours and release it to the interior at night as temperatures drop. In summer months, the same phase change material, due to its thermostatic character, conserves coolness by absorbing energy.

Structural elements incorporating phase change materials are more desirable than elements which store only sensible heat because they have a higher capacity to store energy and they absorb and release a large quantum of energy over a very narrow temperature range. A phase change material utilizes its latent heat of fusion as well as its sensible heat capacity for thermal storage. The latent heat of fusion is substantially greater than the sensible heat capacity of the material. That is, the amount of energy a material absorbs upon melting, or releases upon freezing, is much greater than the amount of energy it absorbs or releases upon increasing or decreasing in temperature 1° C. Thus, upon melting and freezing, per unit weight, a phase change material absorbs and releases substantially more energy than a sensible heat storage material which is heated or cooled through the same temperature range. Furthermore, as contrasted with a sensible heat storage material which absorbs and releases energy essentially uniformly over a broad temperature range, a phase change material absorbs and releases a large quantum of energy in the vicinity of its melting/freezing point. This is particularly advantageous in buildings where space is at a premium and energy storage and release are required within a very narrow comfort range.

It has long been recognized that an effective phase change material, which could store and release thermal energy within the temperature range of 10°–65° C. and could be economically incorporated into common building materials (e.g., concrete, cement, plaster, rubber, plastics), would have broad utility for many heating and cooling applications including solar passive, solar active, off-peak electric load leveling, bridge deck deicing, etc. Other types of phase change materials have been investigated that melt and freeze in the above temperature range, and have a high heat of fusion (e.g., salt hydrates and clathrates); but widespread use has not been achieved because of the difficulty of containerizing them, their instability to repeated thermocycling, corrosion, leakage, etc.

Paraffin waxes have been considered for use in building materials as phase change materials but until now effective methods of incorporating them into building materials were not available and/or they involved prohibitive loss in the physical properties of the building materials.

Among the teachings which were available in the art prior to the present invention are those of U.S. Pat. No. 4,259,401 to Chahroudi et al which discloses both structural and non-structural building materials incorporating phase change materials. These building materials are made up of a rigid porous matrix structure which is impregnated with the phase change material. Three classes of phase change materials are disclosed, namely, hydrated salts, waxes, and clathrates. Cements, plasters or thermosetting materials may form the rigid matrix.

U.S. Pat. No. 4,504,402 to Chen teaches an encapsulated phase change material which is prepared by forming a shell about a phase change composition in compacted powder form. One of the applications of the encapsulated phase change materials is in concrete or gypsum structures.

SUMMARY OF THE INVENTION

The present invention is broadly directed to compositions which are useful in thermal energy storage and include crystalline, long chain, alkyl hydrocarbons having 14 or more carbon atoms, as phase change materials.

Crystalline alkyl hydrocarbon are particularly advantageous phase change materials. The melting temperature of the paraffins increases until a "limiting" melting point of about 130° C. is reached in products having more than 40 carbon atoms in an unbranched chain. Consequently, one can select a crystalline hydrocarbon of any desired melting temperature between 0° and 80° C. for use as a phase change material for solar active and passive applications. Depending on the purity of the compounds, heats of fusion range from about 40 to 60 cal/gm. The compounds are non-toxic, non-corrosive and non-hygroscopic and inexpensive. At the same time, they are fairly resistant to thermal cycling.

It has been found that alkyl hydrocarbons are particularly useful in the form of blends of two or more crystalline alkyl hydrocarbons. More particularly, it has been found that crystalline alkyl hydrocarbon blends obtained at low cost as byproducts of petroleum refining operations are economically advantageous for use in the present invention. Depending on the difference in the melting points of the constituents of the blend, the blend exhibits thermal storage characteristics intermediate those of the individual alkyl hydrocarbons without a decrease in heat of fusion.

By choosing the proper alkyl hydrocarbons, the temperature at which thermal energy is stored can be varied from −12° C. (tetradecane) to 95° C. (commercial microcrystalline waxes). For bridge deck deicing, hexadecane, which melts at about 10° C., is advantageous. For solar passive applications in climate control octadecane, which melts at about 28° C., is used. For solar active storage applications commercial paraffin waxes which melt in the range of 50°–65° C. are desirable.

In accordance with one embodiment of the present invention, crystalline, alkyl hydrocarbons are incorporated into polymeric or inorganic cementitious compositions such as hydraulic cements.

It has been found that alkyl hydrocarbons can be directly incorporated, by dry or wet mixing, into hydraulic cementitious compositions such as concrete, cement and plaster, at concentrations up to 10 percent by weight in the case of certain cements and 10 to 20 percent by weight in the case of gypsum, without prohibitive loss in the strength properties of the matrix. In accordance with more preferred embodiments of the invention alkyl hydrocarbons are pre-mixed with an absorptive filler or incorporated into a hard wax, or rubber or plastic pellet, for incorporation into inorganic cementitious mixes.

In accordance with another embodiment of the present invention, certain flame-resistant agents are used in combination with the crystalline alkyl hydrocarbons to confer flame retardancy. Certain halogenated hydrocarbons are useful for this purpose. These hydrocarbons are preferably used with a polyvalent metal oxide such antimony oxide, which reacts with the halogen liberated upon combustion and generates a dense snuffing gas.

In another embodiment of the invention, the alkyl hydrocarbons are permeated into inorganic cementitious compositions in combination with a polar hydrocarbon such as stearyl alcohol which functions similar to a wetting agent by enhancing the affinity of the hydrocarbon for the cement and enabling the hydrocarbon to permeate a clay or cement body. In this embodiment, the alkyl hydrocarbon not only conveys its thermal storage capacity to the body but may also waterproof it.

In accordance with another embodiment of the invention, the alkyl hydrocarbon is incorporated into plastic or rubber carriers, with or without crosslinking. These composites can be incorporated as granules or pellets into hydraulic cementitious products or used to make floor tiles, wall coverings and the like. Additional thermal storage capacity is gained using crystalline rubber carriers that melt in the same or a different temperature range as the alkyl hydrocarbons and exhibit a significant heat of fusion.

A further embodiment of the present invention resides in polymeric compositions and, more particularly, elastomeric compositions containing crystalline alkyl hydrocarbons useful in forming moldings, sheets, films, rods, fibers, as well as pellets. These compositions can be designed to be useful in the manufacture of flooring, tiles and wall panels having excellent thermal storage capability.

BRIEF DESCRIPTION OF THE DRAWINGS

The present invention will be explained by reference to the accompanying drawings wherein.

DETAILED DESCRIPTION OF THE PREFERRED EMBODIMENTS

Figure 1:
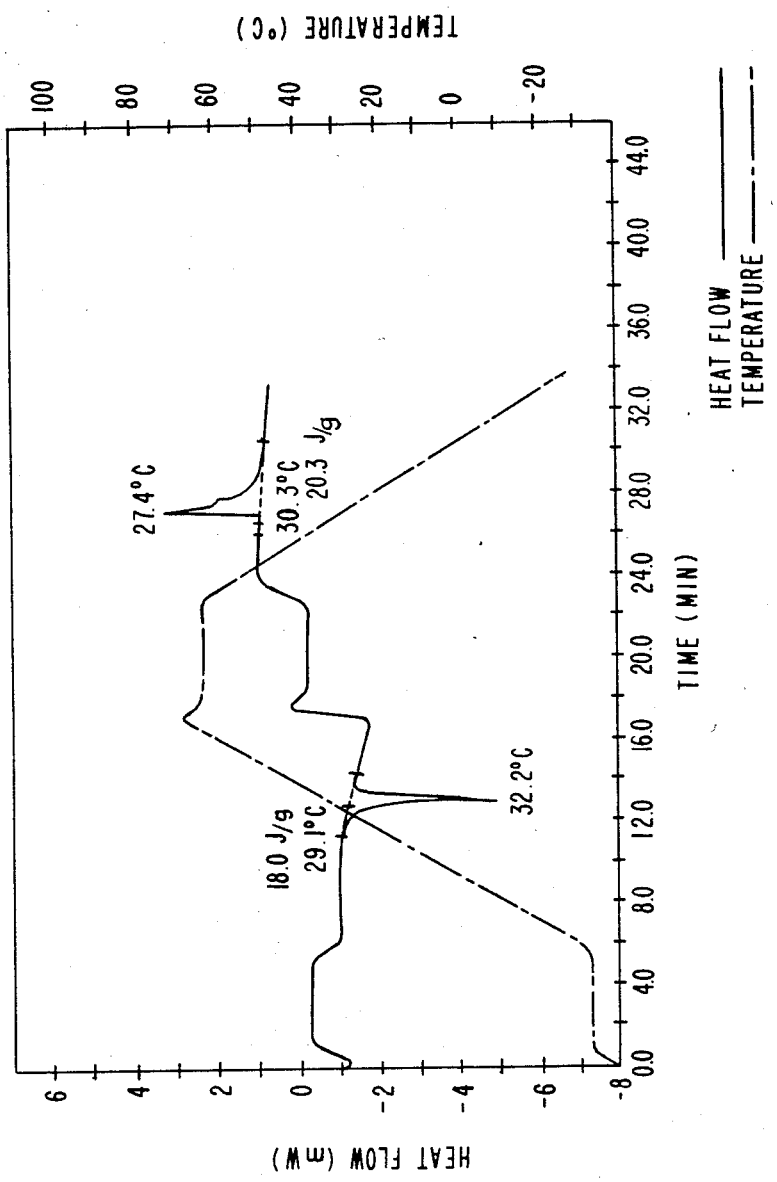
FIG. 1 is a differential scanning calorimetry curve for the cementitious composition of Example 1.

In accordance with the present invention, crystalline alkyl hydrocarbons containing 14 or more carbon atoms are incorporated into matrix materials where they function as phase change materials.

A number of commecially available waxes with melting points up to about 95° C. are useful as phase change materials in the present invention including Shellwax 100 (mp 42°–44° C.), Shellwax 120 (mp 44°–47° C.), Shellwax 200 (mp 52°–55° C.), Shellwax 300 (mp 60°–65° C.), Boron R-152 (mp 65° C.), Union SR-143 (mp about 61° C.), Witco 128 (mp about 53° C.), Witco LLN (mp 40° C.), Witco 45A (mp 31° C.), Witco K-61 (mp 24° C.), Witco K-51 (mp 17° C.), Witco 85010-1 (mp 7° C.), Aristowax 143 (mp 34°–61° C.), and Paraffin 150 (mp about 61° C.). These waxes have heats of fusion greater than 30 cal/g and, by comparison to other phase change materials, they are inexpensive—many of them costing as little as 28 U.S. cents per pound when purchased in tank car quantities. The waxes can be used alone or in combination. For example, higher melting commercial paraffin waxes such as Shell 100 (mp 42° C.), Shellwax 120 (mp 44–47° C.), Shellwax 200 (mp 52°–55° C.), Witco 128 (mp 53° C.), Paraffin 150 (mp 61° C.), can be blended with lower melting $C_{16}$ (mp 10° C.) and $C_{18}$ (mp 28° C.) crystalline hydrocarbons to produce phase change materials with intermediate melting temperatures and these can be incorporated into structural materials as described above.

A preferred group of waxes for use in the present invention are mixtures of crystalline alkyl hydrocarbons in which the melting points of the individual constituents fall within a range of about 0° to 95° C. and more preferably 5° to 60° C. If the difference in melting points of the waxes making up the mixture is greater than about 20° C., the blend will exhibit two distinct melting points and, hence, possess two heats of fusion.

A particularly preferred class of waxes useful in the present invention contain a blend of alkyl hydrocarbons and are obtained at low cost as byproducts of petroleum refining. Because they are inexpensive, they can be incorporated into building materials at minimal additional expense and, at the same time, provide high savings in terms of reduced energy costs. The preferred blends for passive heating have a melting point in the range of 24 to 32° C.. Preferred blends for passive cool storage have a melting point in the range of 18 to 24° C. In many applications, the blends will be relied upon for heating and cooling. A blend melting and freezing at 23° to 25° C. can be used as a thermal mass throughout a building for heating and cooling. A particularly preferred blend is available from Witco Chemical Corporation under the designation K-61. This wax has a melting point of 24° C. and a freezing point of 19.8° C. (by differential scanning calorimetry at 10° C./min. rate of heating and cooling). Chromatographic analysis of K-61 shows that it principally contains normal paraffins of 16 to 21 carbon atoms with major fractions consisting of 17, 18, 19 and 20 carbon atoms.

Thermal energy storage data for five products obtained from Witco Chemical Corporation are shown in the following table which shows that blends having melting and freezing temperatures which cover the entire range that is deemed to be of interest for solar passive heating and cooling are available.

|   | | $T_m$ °C. | $T_c$ °C. | $T_m - T_c$ °C. | $H_f$ cal/gm | $H_c$ cal/gm |
|---|---|---|---|---|---|---|
| 1. | WITCO LLN | 40.0 | 34.7 | 5.3 | 51.1 | 49.2 |
| 2. | WITCO 45-A | 31.4 | 26.3 | 5.1 | 41.2 | 40.0 |
| 3. | WITCO K-61 | 24.0 | 19.8 | 5.2 | 48.4 | 47.8 |
| 4. | WITCO K-51 | 17.4 | 12.3 | 5.1 | 47.6 | 47.2 |
| 5. | WITCO 85010-1 | 7.6 | 4.0 | 3.6 | 30.4 | 31.0 |

Another important consideration in the selection of the alkyl hydrocarbons used in the present invention is their tendency for supercooling or superheating. It is desirable to use alkyl hydrocarbons which show little or no supercooling even when cooled at rapid rates such as 10° C./min. In any case, the difference in observed melting and freezing temperatures due to supercooling or superheating is preferably less than 10° C. More preferably this difference is less than 5° C. and most preferably less than about 3° C.

In addition to providing blends of alkyl hydrocarbons which exhibit phase change characteristics which are intermediate or approximately the average of the individual phase change materials making up the blend, it is also possible to provide blends which exhibit two or more distinct phase changes. Such blends are useful in applications where the phase change material is relied upon to conserve heat in the winter and consume cool in the summer. For this embodiment of the invention the difference in the melting points of the phase change materials should be at least 15° C. Typical examples of such dual temperature blends is a blend which freezes at 15° C. and melts at 35° C. on heating. Many waxes, as commercially obtained, are not preferred for use in passive energy storage systems as used in climate control because their melting point is too high. Consequently, in accordance with the invention, these materials may be combined with crystalline alkyl hydrocarbons having 14–18 carbon atoms and, more specifically, 14, 16, or 18 carbon atoms in order to bring the melting point of the blend within the range of 16 to 42° C.

Stearic acid esters are also useful phase change materials. Examples of useful stearic acid esters include methyl stearate, ethyl stearate, propyl stearate, butyl stearate, etc. Butyl stearate changes phase sharply at about 23° C. and can be permeated into crosslinked polyolefins and percolated into plasterboard.

A particularly desirable embodiment of the present invention utilizes flame-resistant halogenated hydrocarbons and, more particularly, flame-resistant crystalline chlorinated hydrocarbons for flame retardancy. Typical examples of flame-resistant hydrocarbons are halogenated hydrocarbons such as chlorinated, brominated or fluorinated hydrocarbons. Representative examples include Chlorowax 70S, available from Diamond Shamrock Corp. Other halogenated hydrocarbons (which are not phase change materials) can also be used, several of which are available from Ethyl Corporation. Included among them are tetrabromophthalic anhydride, tetrabromobisphenol A, and decabromodiphenyl oxide.

A particularly useful flame-resistant hydrocarbon is a brominated hydrocarbon which is miscible in the phase change material. Miscibility is particularly important when permeating the flame-resistant hydrocarbon into already formed plasterboard along with the phase change material. Examples of brominated hydrocarbons which are miscible in the phase change material are brominated alkanes, and more particularly, brominated cycloalkylalkanes such as dibromoethyldibromocyclohexane which is available as Saytex BCL-462 from the Ethyl Corporation.

The flame resistant hydrocarbon is preferably incorporated into the phase change material in a concentration which provides a self-extinguishing product. In the case of Saytex BCL-462, amounts as low as 10% by weight based on the phase change material are sufficient for this purpose.

Halogenated hydrocarbons are preferably used in combination with conventional flame-resistant fillers such as antimony oxide and other polyvalent metal oxides. The weight ratio of halogenated hydrocarbon to oxide may vary, but it is typically about 1:1 to 3:1. Flame-resistant wax formulations have previously been added to polymers to render them self-extinguishing. Wax formulations used for this purpose may also be useful as flame-resistant phase change materials in accordance with the present invention.

Another useful fire retardant is a halogenated phosphate. Particularly useful flame-resistant halogenated phosphates are chlorinated phosphates such as tri(beta-chloroisopropyl) phosphate which is commercially available under the designation FYROL PCF from Stauffer Chemical Company, Specialty Chemical Division and tri(beta-chloroethyl)phosphate which is commercially available under the designation PHOSGARD C-22R from Monsanto Chemical Company. Although insoluble in the phase change material, tri(beta-chloroisopropyl) phosphate can be dispersed in the phase change material.

It has been found that alkyl hydrocarbons are compatible with both cementitious and polymeric materials and, as such, they can be incorporated into these materials and used in the building trade to provide structures having desirable thermal energy storage characteristics.

The inorganic cementitious compositions of the present invention include an inorganic cementitious material as a rigid matrix-forming material Typical examples of useful cementitious materials are hydraulic cements, gypsum, plaster of Paris, lime, etc. Portland cement is by far the most widely used hydraulic cement. Portland cements are ordinarily used for construction purposes. Types I, II, III, IV, and V may be used. White cements, air entrained cements, high alumina cements, masonry cements can also be used.

Concretes are mixtures of hydraulic cements and aggregates. Typical aggregates include coarse aggregates such as gravel, granite, limestone, quartz, etc., as well as so-called fine aggregates such as sand and fly ash. Conventional hydraulic cement concretes, e.g., Portland cement concretes, employ major amounts (e.g., about 50 to 75% by volume) of such aggregates in the set product. These cements and concretes fall within the term "inorganic cementitious material" as it is used herein.

The inorganic cementitious compositions of the present invention also include concrete and plaster compositions useful in the manufacture of pre-formed materials such as concrete blocks, dry wall, and the like as well as in forming poured concrete structures such as used in forming the walls, floors, floor pads and partitions of buildings. In addition, the compositions of the present invention also include compositions useful in road, runway and bridge deck construction where icing can be prevented by incorporation of the phase change material for thermal energy storage during the day, and release during the night to prevent freezing of water on the surface.

Alkyl hydrocarbons can be incorporated into inorganic cementitious compositions directly by blending the hydrocarbon with the other components of the cement or concrete prior to shaping the compositions and allowing them to harden. Another method that can be used to great advantage is to permeate pre-formed and hardened porous building materials with the alkyl hydrocarbons. Various concrete, stone-like, or clay based elements such as dry wall, cured cement products, bricks, and concrete blocks can be permeated with an alkyl hydrocarbon in this manner.

Infiltration is especially adapted for retrofitting applications. To infiltrate pre-formed building materials it is generally necessary to heat the material to a temperature in excess of the melting point of the alkyl hydrocarbon. Of course, in some applications it may not be necessary to actually penetrate the underlying substrate with the alkyl hydrocarbon. Rather, the alkyl hydrocarbon composition can simply be coated on the surface layer of the substrate such that it penetrates into the surface.

The infiltration with C-18 alkyl hydrocarbon can be used to treat and saltproof, existing highway bridge decks or airport runways to prevent the deterioration caused by salt-induced corrosion of the bridge's reinforcing steel rods. If the alkyl hydrocarbon is selected to melt and freeze just above 0° C., the safety hazard, in the snow belt, where the bridge deck freezes before the rest of the highway can simultaneously be reduced or eliminated.

When incorporated into inorganic cementitious compositions by direct blending or by permeation, the alkyl hydrocarbons are preferably used in combination with a polar hydrocarbon which functions similar to a wetting agent by enhancing the affinity of the alkyl hydrocarbon for the cement and/or lowering its surface tension. In this case the alkyl hydrocarbon permeates the concrete and, in addition to functioning as a phase change material, also functions in waterproofing the concrete.

Representative examples of useful polar hydrocarbons include long chain (i.e., having more than 12 carbon atoms) fatty acids and alcohols such as stearic acid, stearyl alcohol and polar waxes such as montan wax or hydrogenated tallow. The polar hydrocarbon used is also a phase change material and thus may be used in amounts up to 100 parts per 100 parts of alkyl hydrocarbon and preferably about 1 to 25 parts per 100 parts alkyl hydrocarbon. The alkyl hydrocarbon migrates throughout the concrete, and to the surface whereby it seals the concrete and renders it waterproof.

It has been found that directly incorporating alkyl hydrocarbons into cement or concrete compositions prior to hardening tends to reduce the strength (not the setting time) of the set concrete. The alkyl hydrocarbon is lubricative and reduces the amount of adhesion of the cement to the sand and aggregate that can occur in the concrete matrix. It is generally not desirable to use more than about 5% dry weight alkyl hydrocarbon in a concrete composition. However, if the amount of aggregate in the composition is reduced or the aggregate is completely eliminated, approximately 10% alkyl hydrocarbon may be added. On the other hand, in gypsum, plaster of paris, or dry wall compositions, between 10 and 20% by weight of the alkyl hydrocarbon may be added into the wet mix.

It has also been found that the amount of alkyl hydrocarbon incorporated into inorganic cementitious compositions such as Portland cement compositions and the like can also be increased if the alkyl hydrocarbon is used in combination with a highly absorptive filler such as a finely divided silica (e.g., CAB-O-SIL or HiSil). It has been found that by pre-mixing the alkyl hydrocarbon with such a highly absorptive filler, the hydrocarbon resides in the filler and detracts less from the strength of the concrete or cement composition.

There is no lower limit on the amount of alkyl hydrocarbon used in the composition since theoretically any amount will provide some thermal storage benefit. Typically, the compositions of the present invention contain at least 1% of the crystalline alkyl hydrocarbon.

As previously disclosed, the alkyl hydrocarbons maybe used in combination with other halogenated hydrocarbons and a polyvalent metal oxide to impart flame retardancy to the composition. If the polyvalent metal oxide is mixed directly with the alkyl hydrocarbon and permeated into a concrete block, brick, or the like, the porous network of the block often strains the oxide from the wax composition. Consequently, when infiltrating concrete and clay structures with alkyl hydrocarbons, it has been found desirable to pre-mix the metal oxide with the concrete composition and to permeate the hardened concrete product with the halogenated wax-containing alkyl hydrocarbon.

Because there is a tendency for alkyl hydrocarbons to detract from the physical properties of set concrete compositions, it may be desirable to incorporate the hydrocarbon in the cement compositions in one of the polymeric or wax compositions described below in the form of a pellet or granule ranging from about 0.25 to 3.0 mm in particle size.

Pellets or granules can be produced by incorporating the alkyl hydrocarbon in a polymer, and grinding or cutting the polymer. For use in cementitious compositions, the polymeric compositions need not be cross-linked since the thermal form stability of the pellet is not important. In this case, the cementitious composition can include up to 50% by weight of the pellets or granules containing the hydrocarbon phase change material. To increase the amount of alkyl hydrocarbon incorporated or imbibed into the pellet and to hold it in the pellet it is often desirable to include the aforementioned absorptive silica filler in the pellet.

In accordance with one embodiment of the invention, pellets are formed using hard waxes instead of polymers. The waxes may be crystalline or non-crystalline. When they are crystalline, depending upon the conditions at which they are used, their heat of fusion may contribute to the thermal storage characteristics of the pellet. This is particularly useful in active thermal energy storage where higher temperatures are used.

Representative examples of hard waxes which are useful in the present invention include Shellwax 300, a product of Shell Oil Company, Chlorowax 70S, stearic acid, and high melting microcrystalline waxes (e.g., Petrolite waxes available from Barco Products). These waxes are characterized in that they have a melting point greater than 50° C. and a penetration hardness as measured by ASTM D 1321–61T less than about 10.

The cementitious compositions of the present invention can be designed for use in various passive thermal storage applications by appropriately selecting the melting point of the alkyl hydrocarbons. Alkyl hydrocarbons which melt in the range of about 16° to 42° C. are used in passive solar heating such as in the building materials and structures previously mentioned. For bridge deck or roadway deicing, alkyl hydrocarbons which melt at about 5° to 15° C. are preferably used.

In accordance with the present invention, alkyl hydrocarbons can also be incorporated into thermosetting or thermoplastic, elastomeric or non-elastomeric polymeric materials to form wall coverings, floor coverings or the aforementioned pellets. Included within the scope of the term "polymeric materials" are natural and synthetic rubbers. The polymeric material must be compatible with the alkyl hydrocarbons such that the alkyl hydrocarbon can be incorporated into the polymeric material and remain dispersed therein upon molding or coating. If the materials are not sufficiently compatible, the alkyl hydrocarbon will be more difficult to disperse in the polymer and will be present as a dissolved phase and as a phase of dispersed droplets. Whether the alkyl hydrocarbon is dissolved or dispersed does not appear to have a significant effect on the melting and crystallization of the phase change material.

Crystalline long chain hydrocarbons can be most readily dispersed in less polar or non-polar rubbers or polymers such as natural rubber, butyl rubber, polybutadiene, copoly(butadiene/styrene) and copoly(ethylene/propylene) (EPDM). They can also be dispersed in polar polymers such as nylons, polyesters, acrylate rubbers, methacrylate rubbers, polyvinyl alcohol, ethylene vinylacetate copolymers, polyvinyl acetate, vinyl chloride/vinyl acetate copolymer, Neoprene, butadiene-acrylonitrile rubber, etc. It is also desirable to use flame resistant halogenated polymers such as Neoprene, polyvinyl chloride, and polyvinylidene chloride.

The polymeric compositions of the present invention can be used in a crosslinked or uncrosslinked form depending on end use and the need for thermal form stability. Crosslinking does not necessarily interfere with the phase change properties of the crystalline alkyl hydrocarbon. However, it is essential that the polymer compositions not be crosslinked to an extent that the phase change material loses its ability to melt and freeze effectively and results in reduced heat of fusion.

It is particularly advantageous to incorporate the alkyl hydrocarbon into rubbers and other elastomers having significant crystallinity so that they can also function as phase change materials. Natural rubber reportedly has phase transitions at −6° and 25° C. Neoprene (polychloroprene) reportedly has a crystalline melting point at about 32° C., as is desirable for comfort heating. Other semi-crystalline rubbers include some EPDM, and copoly- (ethylene/vinyl acetate) rubbers. Hence, a crystalline matrix rubber containing an alkyl hydrocarbon can provide augmented thermal energy storage capacity since both parts of the composite contribute.

The alkyl hydrocarbon can be incorporated into the aforesaid polymeric compositions in amounts of up to 50% by weight, depending on the nature of the hydrocarbon and the polymer used. Theoretically, there is no lower limit on the amount of phase change that is used since some thermal energy storage benefit (although small) accompanies any addition. Usually, the phase change material is used in an amount of at least 1% by weight.

In forming molded products, the alkyl hydrocarbon can be mixed with the polymeric material in a conventional manner, e.g., in a Banbury or on a roll mill. Furthermore, conventional plasticizers, fillers, pigments, curing agents, accelerators, etc., can be added to the compositions to adjust their physical properties as desired. It is advantageous to add fillers such as finely divided silica and carbon black to the polymer composition. They may be added in amounts ranging from about 10 to 100 parts per 100 parts of polymer.

The polymeric compositions of the present invention can be compounded in an otherwise conventional manner to provide compositions useful in forming rubber floor tiles, flooring and the like.

In accordance with another embodiment of the invention, polymeric thermoset foams such as polyurethane, or thermoplastic polystyrene foams useful in insulation and other applications may be filled with an alkyl hydrocarbon to enhance their insulative capacity in accordance with the present invention. Flexible open celled foams can be filled with an alkyl hydrocarbon by compressing the foam in a melt of the hydrocarbon, and removing the excess by re-compressing the foam after removing it from the melt. Preferred foams are flexible, low density, open cell foams; however, substantially any foam in which enhanced thermal storage characteristics are desired can be impregnated with a phase change material in accordance with the present invention.

In accordance with still another embodiment of the invention, pellets formed in accordance with the present invention are used in active or passive hybrid thermal storage systems such as a pellet bed heat exchanger in which a heat exchange fluid such as air, ethylene glycol, water or the like is circulated through a pellet bed. In this use the pellets (the carrier polymer) are preferably crosslinked and the alkyl hydrocarbon has a melting point in the range of 10° to 65° C. In one embodiment of the invention black pellets (e.g., containing carbon black filler) can be formed and used as a combination collector and storage unit. These pellets can be used in solar water heaters where they absorb sunlight and store energy. In this embodiment a phase change material having a melting point of about 140° F. is used. Similarly, pellets formed in accordance with the invention can be used in a coffee or tea cup to keep the drink warm.

A partial listing of building materials which can be modified to incorporate alkyl hydrocarbons as phase change materials in accordance with the present invention includes plasterboard, plaster, cement blocks, cement stucco, cement floors, plastic and rubber floor tiles, foam insulation and paints.

The present invention is illustrated in more detail by reference to the following examples.

EXAMPLE 1

A cementitious phase change composition was prepared by adding octadecane to an aqueous slurry of gypsum in an amount of 10 parts octadecane per 90 parts gypsum. The composition was allowed to harden and submitted to differential scanning calorimetry (DSC) analysis. The temperature scan rate was 10° C. per minute. The DSC curve is shown in FIG. 1. The figure clearly shows the melting (32.2° C.) and crystallization (27.4° C.) of octadecane. Thus, the C-18 alkyl hydrocarbon retains its advantageous latent heat storage characteristics in gypsum.

EXAMPLE 2

Figure 2:
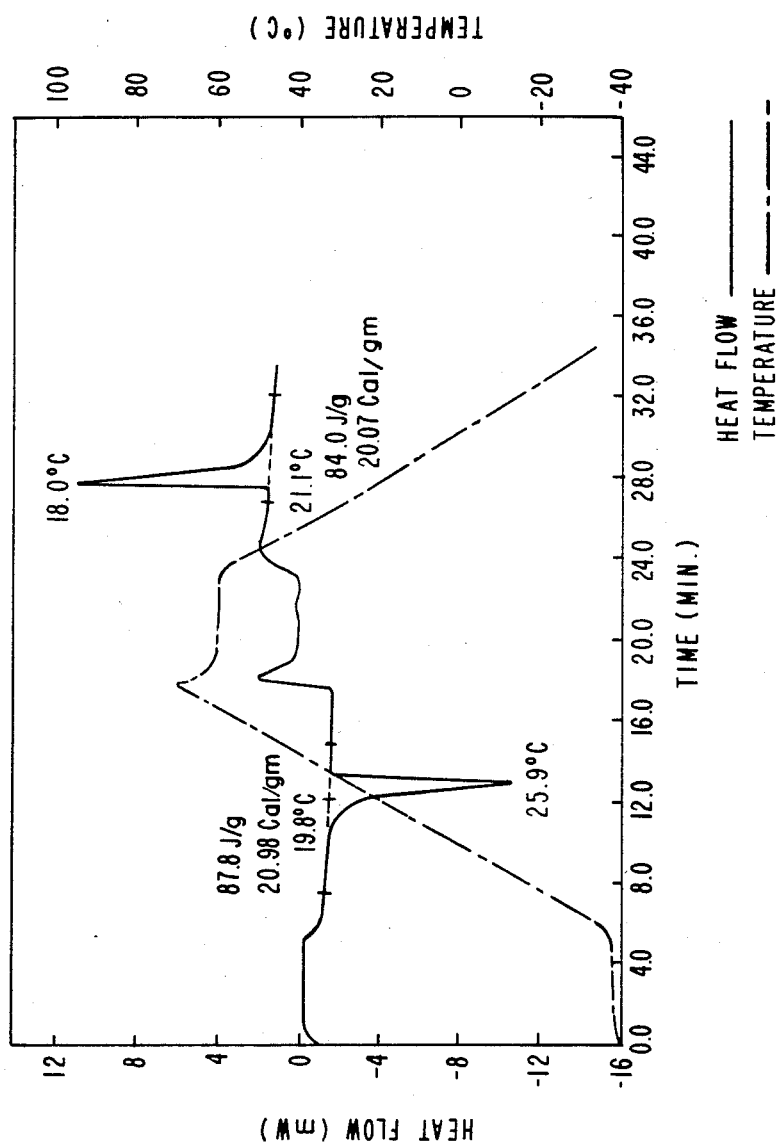
FIG. 2 is a differential scanning calorimetry curve for the polymeric composition of Example 2.

A rubber composition useful in forming sheets or pellets for passive thermal storage was prepared by compounding 100 parts natural rubber, 100 parts octadecane, 1 part stearic acid, 40 parts Cabosil, 2.0 parts Santecure NS, 5.0 parts zinc oxide, 2.5 parts Flexzone, and 2.5 parts sulfur. The composition was cured at 350° F. for 30 minutes and submitted to DSC analysis. The DSC curve at a temperature scan rate of 10° C./Min. is shown in FIG. 2. Melting and crystallization of the octadecane occurred at 25.8° C. and 18.2° C., respectively. The heat of fusion of the octadecane was thus retained.

EXAMPLE 3

The following rubber (EPDM) compositions were prepared and cured at 350° F. for 30 minutes. The alkyl hydrocarbons employed in each of the compositions retained their melting point and heat of fusion characteristics.

|  | Parts by Weight | | | | | |
|---|---|---|---|---|---|---|
|  | 1 | 3 | 7 | 5 | 9 | 11 |
| EPDM | 100 | 100 | 100 | 100 | 100 | 100 |
| Shell X-100 Paraffin Wax (Shell Oil Co.) | 66 | 66 | 50 | 33 | 33 | 33 |
| Silica Filler | 50 | — | 50 | 50 | — | — |
| Carbon Black Filler | — | 50 | — | — | 50 | 50 |
| Stearic Acid | 5 | 5 | 5 | 5 | 5 | 5 |
| DiCup R (Hercules Chemical Co., vulcanizing agent) | 3 | 3 | 3 | 3 | 3 | 3 |
| Octadecane | — | — | 16 | 33 | — | — |
| Octadecane (technical grade) | — | — | — | — | 33 | — |
| Hexadecane | — | — | — | — | — | 33 |

EXAMPLE 4

Twelve 2"×2" squares of plasterboard were dried in a vacuum dessicator overnight and then weighed and labeled. Separate melt mixed percolating baths were prepared containing LLN/BCL-462/stearic acid in the ratios of 85/10/5, 80/15/5 and 75/20/5. Another series was prepared using 45A/BCL-462/stearic acid in the same ratios. The blends were weighed into metal beakers and heated to 80° C. Duplicate plasterboard samples were immersed in each blend for ten minutes. After ten minutes in the bath, the samples were immediately removed and weighed to calculate the percent phase change material (PCM) absorbed which is listed in Table 1 for each sample.

TABLE 1
WITCO 45A/BCL-462/STEARIC ACID PICKUP IN PLASTERBOARD PERCOLATED WITH THE FIRE RETARDANT COMPOSITIONS

| Sample # | Ratio | Dry Weight Final % PCM Pickup |
|---|---|---|
| | 45 A/BCL 462/Stearic Acid | |
| 1 | 85/10/5 | 33.8 |
| 2 | 85/10/5 | 34.13 |
| 3 | 80/15/5 | 35.08 |
| 4 | 80/15/5 | 34.09 |
| 5 | 75/20/5 | 33.91 |
| 6 | 75/20/5 | 33.02 |
| Control 1 | 95/0/5 | 32.99 |
| Control 2 | 95/0/5 | 32.75 |
| | LLN/BCL 462/Stearic Acid | |
| 7 | 85/10/5 | 34.38 |
| 8 | 85/10/5 | 34.02 |
| 9 | 80/15/5 | 34.80 |
| 10 | 80/15/5 | 34.69 |
| 11 | 75/20/5 | 34.96 |
| 12 | 75/20/5 | 34.22 |
| Control 1 | 95/0/5 | 35.75 |
| Control 2 | 95/0/5 | 34.96 |

The paper cover was completely removed from one of the squares in each group. Each sample was mounted horizontally in a hood and ignited for ten seconds with a Bunsen burner. Table 2 is a compilation of the fire retardant test data.

TABLE 2
FIRE RETARDANCE TESTS OF PERCOLATED PLASTERBOARD

| Sample # | Ratio | Ignite in 10 sec | Time to Extinguish | Time to Ignite and Stay Lit | Flame Traveled | Time to Extinguish | Smoke |
|---|---|---|---|---|---|---|---|
| | | | 45A/BCL 462/Stearic Acid | | | | |
| 1 | 85/10/5 | Yes | Immed. | 30 sec | Yes | 375 sec | wh & blk |
| 2 | 85/10/5 | Yes | Immed. | 29 | Yes | 390 | wh & blk |
| 3 | 80/15/5 | Yes | Immed. | 26 | Yes | 341 | wh & blk |
| 4 | 80/15/5 | Yes | Immed. | 25 | Yes | 201 | wh & blk |
| 5 | 75/20/5 | Yes | Immed. | 30 | Yes | 160 | wh & blk |
| 6 | 75/20/5 | Yes | Immed. | 30 | Yes | 130 | wh & blk |
| Control 1 | 95/0/5 | Yes | 10 min. | 10 | Yes | 10 min. | wh & blk |
| Control 2 | 95/0/5 | Yes | 10 min | 10 | Yes | 10 min. | wh & blk |
| | | | LLN/BCL 462/Stearic Acid | | | | |
| 7 | 85/10/5 | Yes | Immed. | 12 sec | Yes | 323 sec | wh & blk |
| 8 | 85/10/5 | No | Immed. | 15 | Yes | 272 | wh & blk |
| 9 | 80/15/5 | Yes | Immed. | 20 | Yes | 237 | wh & blk |
| 10 | 80/15/5 | No | Immed. | 25 | Yes | 196 | wh & blk |
| 11 | 75/20/5 | Yes | Immed. | 30 | Yes | 155 | wh & blk |
| 12 | 75/20/5 | No | Immed. | 36 | Yes | 58 | wh & blk |
| Control 1 | 95/0/5 | Yes | 10 min. | 10 | Yes | 10 min. | wh & blk |
| Control 2 | 95/0/5 | Yes | 10 min | 10 | Yes | 10 min. | wh & blk |

NOTE: Even-numbered samples had paper covers removed.

Controls were included containing LLN/stearic acid and 45A/stearic acid in the ration of 95/5.

Having described the invention in detail and by reference to specific embodiments thereof, it will be apparent that numerous modifications and variations are possible without departing from the scope of the following claims.

What is claimed is:

1. A composite useful in thermal energy storage comprising a matrix material having incorporated therein a phase change material, said phase change material being a crystalline, straight chain, alkyl hydrocarbon having 14 or more carbon atoms and a heat of fusion greater than 30 cal/g., said composite also comprising a flame retarding agent selected from the group consisting of halogenated hydrocarbons and halogenated phosphates.

2. The composite of claim 1 wherein said matrix material is an inorganic cementitious material.

3. The composite of claim 2 wherein said inorganic cementitious material is selected from the group consisting of hydraulic cements, gypsum, and concrete.

4. The composite of claim 3 wherein said phase change material is incorporated into said matrix material in the form of a pellet.

5. The composite of claim 4 wherein said pellet comprises a matrix of a hard wax having a melting point greater than 50° C. and a penetration hardness less than 10 containing said phase change material.

6. The composite of claim 3 wherein said phase change material is pre-mixed with a highly absorptive filler before being introduced to said matrix material.

7. The composite of claim 1 wherein said flame retarding agent also includes a polyvalent metal oxide.

8. The composite of claim 2 wherein said composite is formed by infiltrating said matrix material with said phase change material in combination a wetting agent.

9. The composite of claim 8 wherein said wetting agent is stearic acid or stearyl alcohol.

10. The composite of claim 1 wherein said alkyl hydrocarbon is selected from the group consisting of Shellwax 100, Shellwax 120, Shellwax 200, Shellwax 300, Boron R-152, Union SR-143, Witco 128, Witco LLN, Witco 45A, Witco K-61, Witco K-51, Witco 85010-1, Aristowax 143 and Paraffin 150.

11. The composite of claim 2 wherein said alkyl hydrocarbon is a blend of normal alkyl hydrocarbons containing 16 to 20 carbon atoms.

12. The composite of claim 1 wherein said halogenated hydrocarbon is selected from the group consisting of Chlorowax 70-S, tetrabromophthalic anhydride, tetrabromobisphenol A, and decabromodiphenyl oxide; and said polyvalent metal oxide is antimony oxide, the weight ratio of said halogenated hydrocarbon to said antimony oxide being about 1:1 to 3:1.

13. A composite of claim 1 wherein said composite is a bridge deck.

14. A composite useful in thermal energy storage comprising a matrix material having incorporated therein a phase change material, said matrix material being plasterboard and said phase change material being a crystalline, straight chain, alkyl hydrocarbon having 14 or more carbon atoms and a heat of fusion greater than 30 cal/g., said plasterboard also comprising a flame retarding agent incorporated therein said flame retarding agent being selected from the group consisting of halogenated hydrocarbons and halogenated phosphates.

15. A composite useful in thermal energy storage comprising a matrix material having incorporated therein a phase change material and a flame retarding agent, said phase change material being a crystalline straight chain alkyl hydrocarbon having 14 or more carbon atoms and a heat of fusion greater than 30 cal/g and said flame retarding agent being a brominated hydrocarbon which is miscible in said phase change material.

16. The composite of claim 15 wherein said brominated hydrocarbon is a brominated cycloalkylalkane.

17. The composite of claim 16 wherein said brominated cycloalkylalkane is dibromoethyldibromocyclohexane.

18. The composite of claim 1 wherein said flame retarding agent is a flame retarding agent selected from the group consisting of tri(beta-chloroisopropyl) phosphate and tri(beta-chloroethyl)phosphate.

* * * * *